United States Patent [19]

Ruyten

[11] Patent Number: 4,656,321
[45] Date of Patent: Apr. 7, 1987

[54] THREE POSITION SWITCH AND SWITCHING DEVICE FOR A MAGNETIC-TAPE-CASSETTE APPARATUS

[75] Inventor: Henricus M. Ruyten, Wetzlar, Fed. Rep. of Germany

[73] Assignee: U.S. Philips Corporation, New York, N.Y.

[21] Appl. No.: 692,002

[22] Filed: Jan. 16, 1985

[30] Foreign Application Priority Data

Jan. 19, 1984 [DE] Fed. Rep. of Germany ....... 3401645

[51] Int. Cl.⁴ .............................................. H01H 9/20
[52] U.S. Cl. .................................. 200/50 C; 200/6 B; 200/DIG. 34; 360/105
[58] Field of Search ............ 200/50 C, DIG. 34, 6 R, 200/6 A, 6 B, 6 BA, 6 BB, 6 C, 1 B, 330, 331; 360/105

[56] References Cited

U.S. PATENT DOCUMENTS 2,481,368  2/1949  Tiffany et al. .................... 200/6 BB
3,248,508  4/1966  Pastorel .......................... 200/330 X

FOREIGN PATENT DOCUMENTS 442448  2/1936  United Kingdom .

Primary Examiner—A. D. Pellinen
Assistant Examiner—Morris Ginsburg
Attorney, Agent, or Firm—David R. Treacy

[57] ABSTRACT

An electrical switch on a chassis of a magnetic-tape-apparatus has a switching lever movable between a center switch open position, an unstable switched closed position to one side of center, and a stable switched closed position to the other side of center, with an over-center position between the center and stable closed positions. Spaced projections on a head-mounting plate engage the lever during movement between a playing position and a stop/ejection position, so as to cause the lever to move between the center and the stable closed position. With the plate in the stop/ejection position, an actuating rod can pass between the projections to move the lever to the unstable closed position and hold it in that position. When the plate is in the playing position, clearance of the projections from the lever is such that the plate can move a certain distance, for example for fast winding, without engaging the lever.

15 Claims, 18 Drawing Figures

THREE POSITION SWITCH AND SWITCHING DEVICE FOR A MAGNETIC-TAPE-CASSETTE APPARATUS

BACKGROUND OF THE INVENTION

The invention relates to a switching device for a magnetic-tape-cassette apparatus, whose chassis carries a switch which comprises a switching lever which is pivotable about a pivotal axis to cooperate with switching contacts, and which can be set to three operating positions. The switching lever has a center position relative to the switching contacts, in which position the contacts remain open and a closed position on each side of the center, in which the switching contacts are closed. One closed position is stable and the other closed position is unstable.

German Offenlegungsschrift No. 26 36 632 describes an electrical switch which comprises a switching lever which can be pivoted into three different positions. The switching lever can be latched in a center position and in an off-center position, which means that these two positions are both stable. In a third position the switching lever is not latched, so that this position is unstable and the lever returns to the center position when it is not loaded.

Moreover, British Patent Specification No. 442 448 describes a switch comprising a switching lever provided with two flat walls which co-operate with a contact spring. The two flat walls of the switching lever define stable positions of the lever, namely a position in which the switch is open and a position in which the switch is closed. A nose formed between the two flat walls defines an unstable position. In order to enable such a switch to be used for different functions in a magnetic-tape-cassette apparatus the switch should co-operate with certain parts of the apparatus.

SUMMARY OF THE INVENTION

It is the object of the invention to provide a switching device for a magnetic-tape-cassette apparatus, employing a switch which comprises a switching lever which can be actuated to perform different switching functions by two different actuating members of the apparatus.

According to the invention this object is achieved in that the apparatus comprises a movable head-mounting plate which carries two mutually spaced projections; a first projection arranged for pivoting the switching lever into the stable closed position, and a second projection arranged for pivoting the switching lever into its center position. The switching lever pivots from a dead-center position between the stable positions, so that it is clear of the projections in its stable closed position and in its center off position. Further, an actuating rod has a switching tip which can pass between the first and second projections to pivot the switching lever from the center position, to the unstable closed position and can hold the lever in the latter position.

As the projections on the head-mounting plate only touch the switching lever to set this lever to one of the stable positions, the head-mounting plate has enough room to move lesser distances without changing over the switching lever in other situations. This applies, for example, to normal operation without track change-over, when it is required to proceed from the playing mode to the fast-winding mode and vice versa. In addition, without the latter switching facilities being affected, the switch can be set to an unstable position by means of an actuating rod, for example in order to stop or to switch from radio to tape operation and vice versa. As soon as the actuating rod liberates the switching lever the head-mounting plate is again capable of performing the switching functions.

Preferably the connecting line between the projections extends substantially parallel to the direction of movement of the head-mounting plate and the distance between the projections is such that a movement of the head-mounting plate from a playing position into a winding position, in which it is withdrawn from the magnetic tape, can be obtained without actuating the switching lever. This construction permits changeover from the play mode to a fast-winding mode without the tracks being changed over from one playing direction to the other.

It is also preferable that the head-mounting plate has always pivoted the switching lever into the center off position before the actuating rod has reached the position in which switching is effected. This ensures that whenever the actuating rod should influence the switching lever, this rod always meets the switching lever in its path of movement to enable the lever to be pivoted from its center position to the unstable position.

An embodiment of the invention will now be described in more detail, by way of example, with reference to the drawing.

DESCRIPTION OF THE PREFERRED EMBODIMENT

Figure 1:
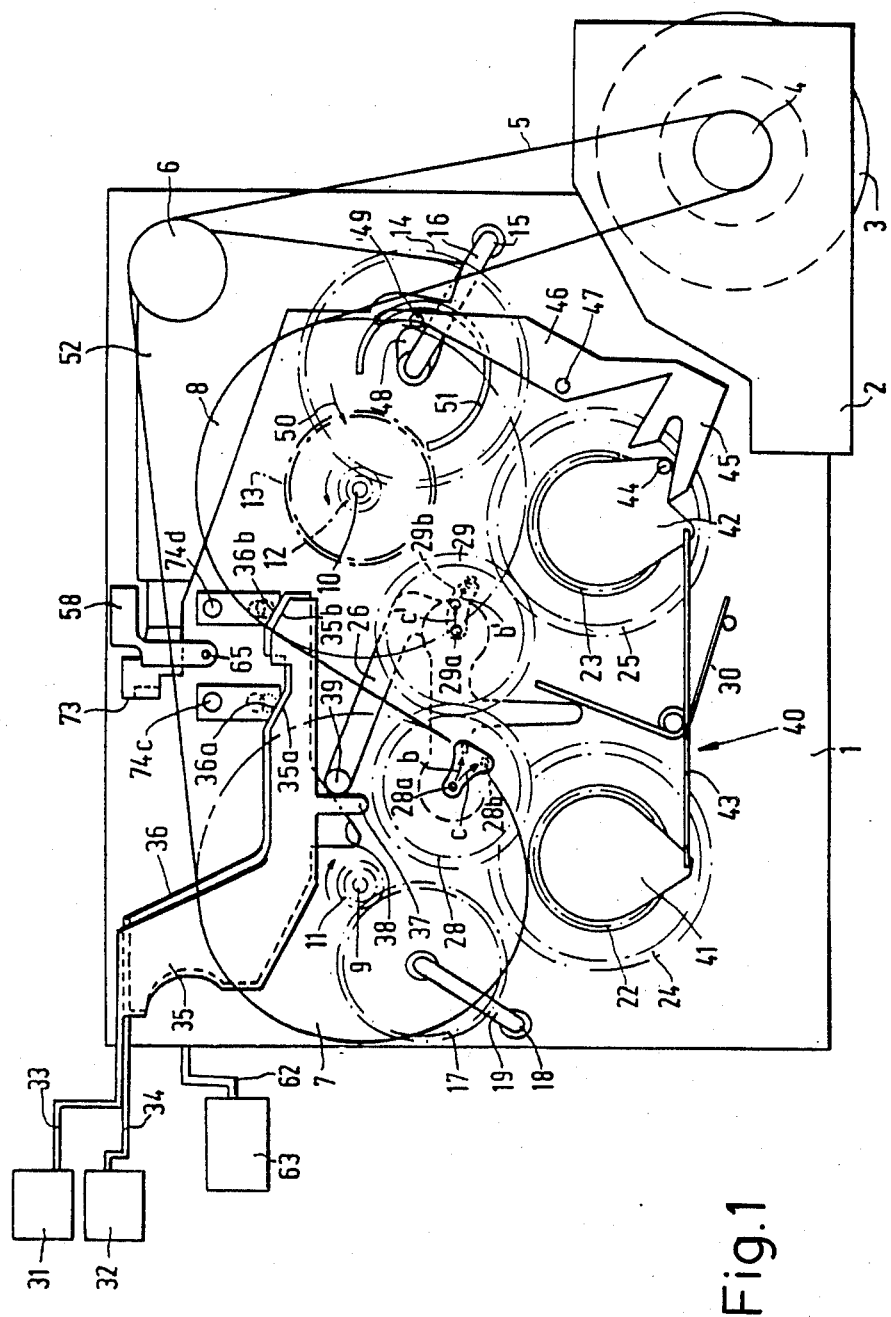
FIG. 1 is a view of the driving side of a magnetic-tape-cassette apparatus suitable for use with the invention.

The magnetic-tape-cassette apparatus in accordance with the invention, as shown in FIG. 1, comprises a frame 1 which carries a non-reversible drive motor 3 on a support 2. The drive pinion 4 of the motor 3 guides a belt 5, which is passed along flywheels 7 and 8 and over a guide roller 6 in such a way that the flywheels rotate in opposite direction. The flywheels 7 and 8 are rotatably journalled in the frame 1. The flywheel 7 is rigidly connected to a capstan 9 and the flywheel 8 is rigidly connected to a capstan 10. Moreover, the flywheel 7 is connected to a gear wheel 11 and the flywheel 8 is connected to a gear wheel 12. Through a slipping clutch a further gear wheel 13, which is coaxial with the gear wheel 12, is rotatable relative to the flywheel 8. A switching wheel 14 in the form of a gear wheel is constantly in mesh with the gear wheel 12 on the flywheel 8. This gear wheel 14 is arranged to be pivotable about a spindle 15. The spindle 15 carries a pivotal arm 16, shown schematically in FIG. 1, on which the switching wheel 14 is mounted for rotation. In a similar way a gear wheel 17 is constantly in mesh with the gear wheel 11. This gear wheel 17 is arranged to be pivotable about a spindle 18 by means of a pivotal arm 19, which is shown schematically.

Figure 3:
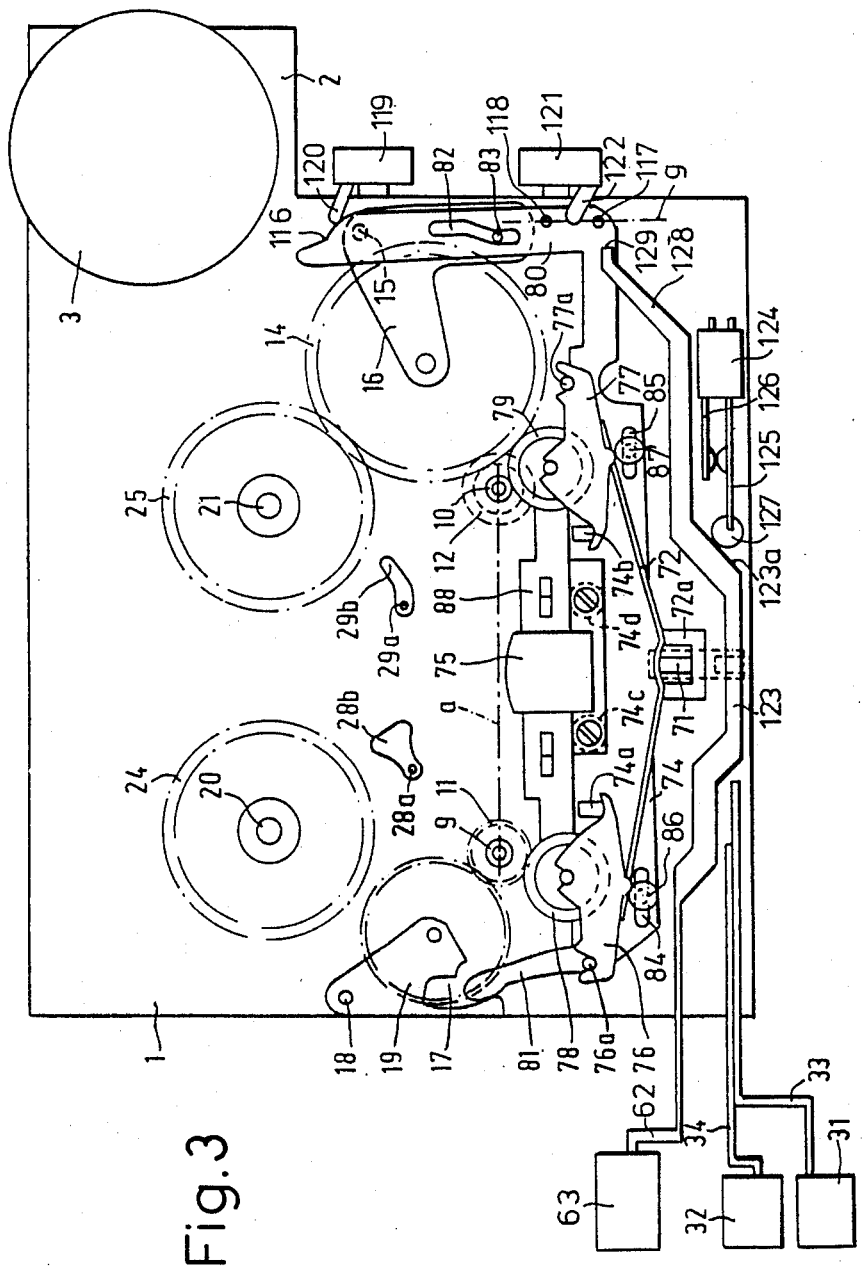
FIG. 3 is a view of the magnetic-head side of the apparatus of FIG. 1, showing the invention, in a position for playing in a first tape-transport direction.
Figure 4:
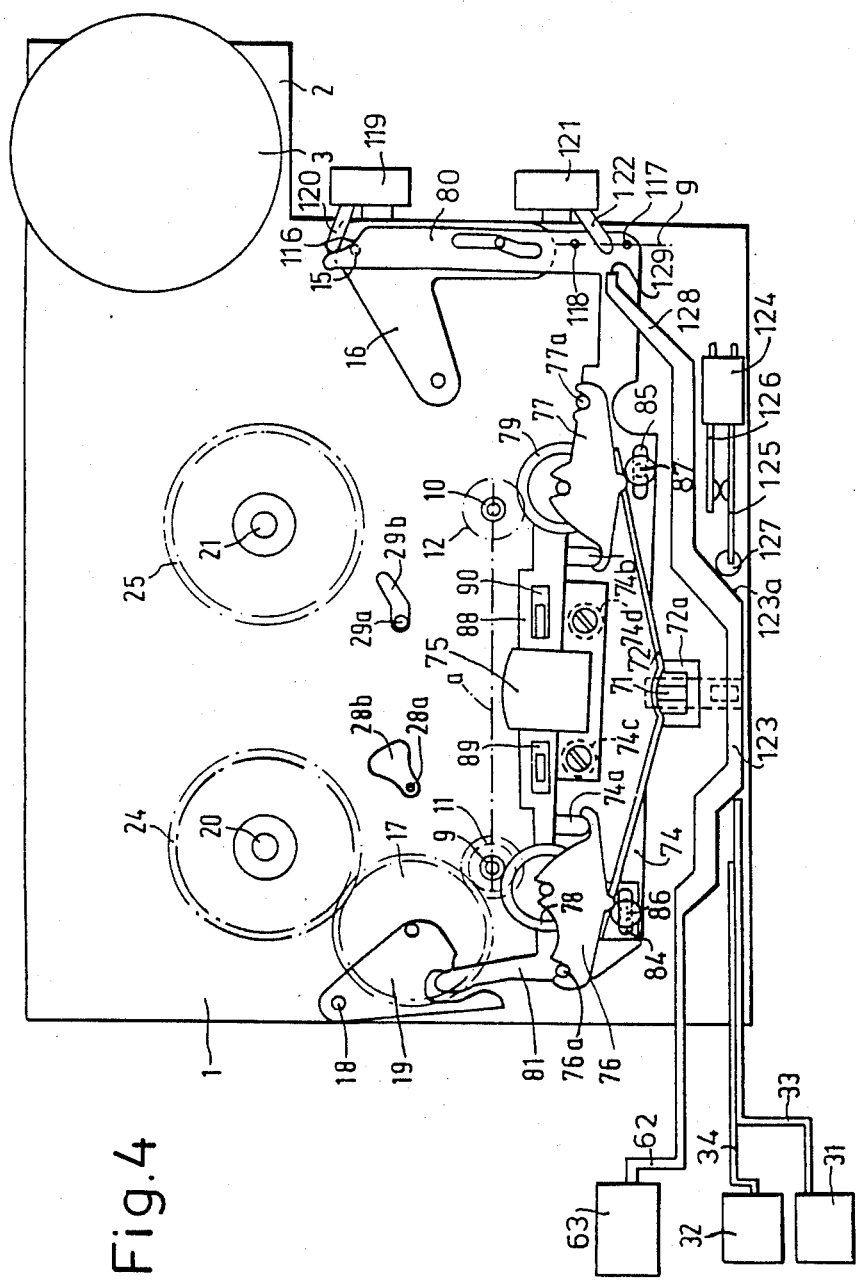
FIG. 4 is a view of the apparatus similar to that in FIG. 3, but in a second, opposite tape-transport direction.

As is also shown in FIGS. 3 and 4, winding spinles 20 and 21 are rotatably journalled in the frame 1. These winding spindles 20 and 21 are rigidly connected to fast-wind wheels 22, 23. Play wheels 24, 25 are coupled through slipping clutches to the winding spindles 20, 21.

FIG. 3 shows how the play wheel 25 is driven by the gear wheel 12 through the spitchng wheel 14. In a similar way FIG. 4 shows how the play wheel 24 is driven by the gear wheel 11 through the gear wheel 17.

A member 26, which is movably guided in the frame 1, carries two gear wheels 28, 29 adjacent and meshing with each other.

A spring 30 urges the member 26 towards the initial position shown in FIG. 1.

The member 26 carries two pins 28a, 29a, which are movably guided in a triangular hole 28b and a slot 29b, respectively, in the frame 1.

For fast forward and reverse winding there are provided two buttons 31 and 32. These buttons 31, 32 are connected to slides 35, 36 through the push-button rods 33 and 34. These slides 35, 36 cooperate with the member 26. For this purpose the slide 35 is formed with a projection 37 and the slide 36 is formed with a guide surface 38. The projection 37 and the guide surface 38 cooperate with a pin 39 on the member 26. The slides 35, 36 further comprise guide surfaces 35a, 35b and 36a, 36b, respectively, which can cooperate with pins 74c, 74d of a head plate 74 (FIGS. 1, 3, 4).

When as a result of the depression of the fastwind button 31 the projection 37 is urged against the pin 39 on the member 26, the gear wheel 29 first comes into mesh with the gear wheel 13. The pins 28a and 29a then move in the directions indicated by the arrows b and c', respectively. As the movement continues, the pin 29a moves further in the direction indicated by the arrow b', as a result of which the fast wind gear wheel 29 also meshes with the gear wheel 23. The magnetic tape is now wound rapidly by the winding spindle 21. If the other fastwind button 32 is depressed the guide surface 38 cooperates with the pin 39 on the member 26. The pins 28a and 29a then move in the directions indicated by the arrows c and c' respectively, so that the gear wheel 29 meshes with the fast wind gear wheel 13 and the gear wheel 28 meshes with the gear wheel 22. In this way the other winding spindle 20 is now driven for fast winding.

When the head-mounting plate 74 has reached a playing position, the pins 74c, 74d assume one of the broken-line-positions shown in FIG. 1. The positions correspond to the positions shown in FIGS. 3 and 4, respectively. Actuating the push-button rods 33 and 34, has the result that, through the guide surfaces 35a, 35b and 36a, 36b, respectively, the pins 74c, 74d and hence the head-mounting plate 74 are moved to the left so that a sound head 75 and pressure rollers 78, 79 are lifted off the magnetic tape.

A detection means 40, comprising two discs 41, 42 and a connecting rod 43, is connected to the winding spindles 20, 21 through slipping clutches. A pin 44 arranged on the disc 42 engages with a switching fork 45. The switching fork 45 is arranged on a switching member 46, which is pivotable about a pivot 47 (see also FIGS. 2a and 2b). The switching wheel 14 carries a central slightly elliptical projection 48. The switching member 46 extends over the switching wheel 14 and carries a pin 49 which, when the switching member 46 has pivoted inwards, slides over the circumference of the projection 48 when the switching wheel is rotated in the direction indicated by an arrow 50. Around the projection 48 a spiral guide wall 51 is formed on the switching wheel 14 at a larger distance. This guide wall 51 can also cooperate with the pin 49 on the switching member 46 when the detection means detects tape stoppage. The pin 44 then no longer urges against the switching fork 45, so that the pin 49 on the switching member 46 is no longer moved inwards towards the projection 48 but remains in the same position and, as the switching wheel 14 continues to rotate in the direction indicated by the arrow 50, reaches the outer side of the guide wall 51. Since the guide wall 51 is spiral-shaped the switching member 46 will be pivoted clockwise about the pivot 47, so that the switching member 46 is urged against a connecting member 52.

Figures 2A, 2B:
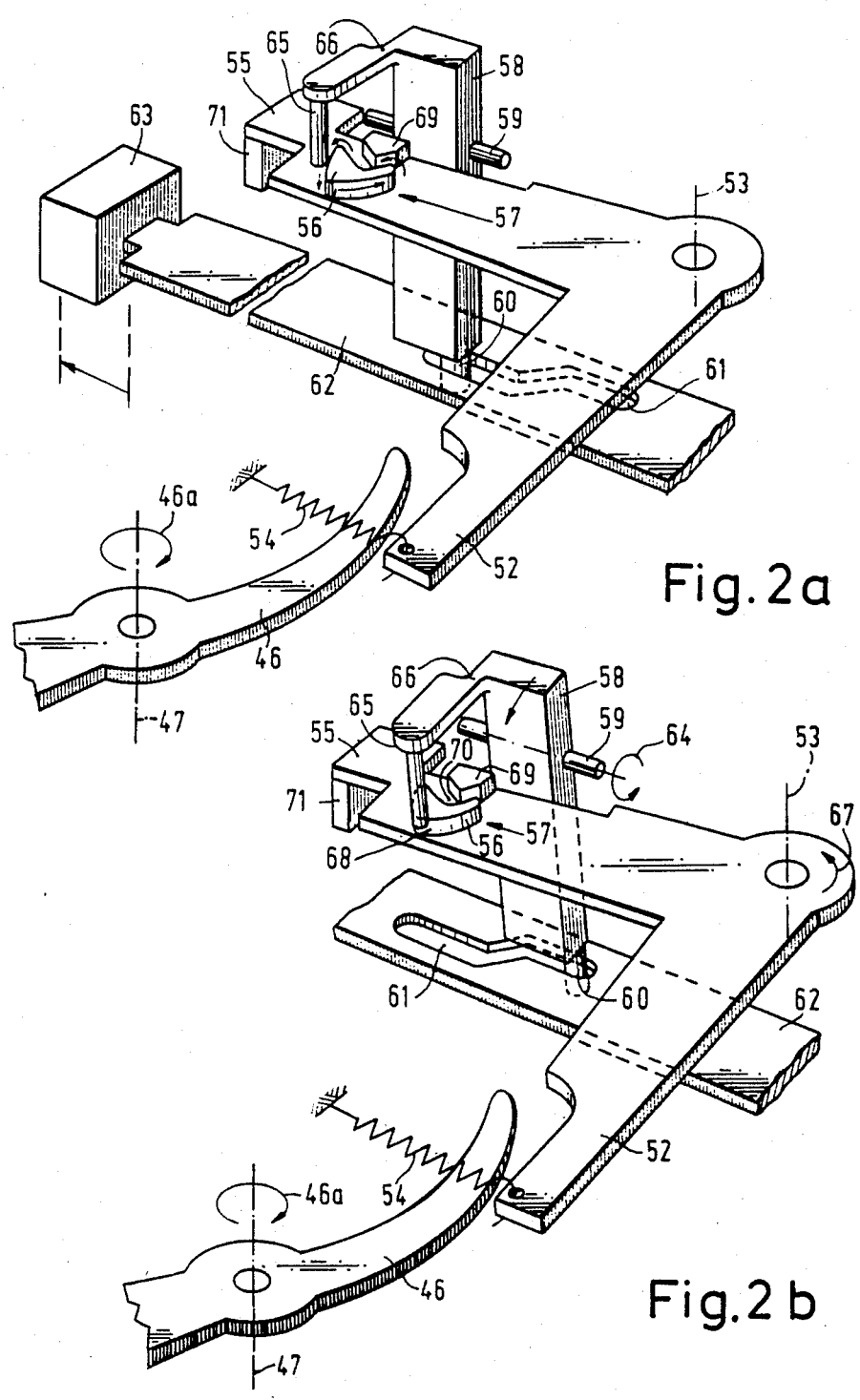
FIG. 2a is an enlarged perspective view of a latching mechanism of the apparatus in a first position.
FIG. 2b shows the latching mechanism of FIG. 2a in a second position.

The connecting member 52 is a lever having two arms, pivotable about a pivot 53. As can be seen in FIGS. 2a and 2b, the connecting member 52 is spring-biased in the clockwise direction by a spring 54. Thus, the movement of the switching member 46 tensions the spring 54.

The lever arm 55 of the connecting member 52 which is remote from the point of engagement with the switching member 46, carries a heart-shaped projection 56 which forms part of a latching mechanism 57. The latching mechanism 57 also comprises a latching lever 58, which can be pivoted about a spindle 59. The spindle 59 extends parallel to the upper surface of the frame 1 and to an imaginary connecting line a between the capstans 9 and 10. The latching lever 58 carries a guide pin 60 on its side which faces the heart-shaped projection 56. The pin 60 extends through a guide slot 61 in an actuating rod 62 of a stop/eject button 63. The guide slot 61 has such a shape that the latching lever 58, as can be seen in FIG. 2b, is pivoted about the spindle 59 in the direction indicated by an arrow 64 when the stop/eject button is released. The outward movement of the stop/eject button 63 and the rod 62 is obtained in a manner, not shown, by inserting a magnetic-tape cassette into the apparatus. FIG. 2a shows the rod 62 in the inward position and FIG. 2b shows the rod 62 in the outward position.

The latching lever 58 carries a latching pin 65, which can engage with and pass around the heart-shaped projection 56. This movement is made possible by means of, for example, an integral hinge 66. In FIG. 2a the pin 65 is situated above the heart-shaped projection 56, because the rod 62 is depressed. in FIG. 2b, in which the actuating rod 62 has moved outwards, the pin 65 is positioned in the area where it can engage with the heart-shaped projection 56. The pin 65 can then cooperate with the heart-shaped projection 56 when the switching member 46 pivots the connecting member 52 in the counterclockwise direction indicated by an arrow 67, as shown in FIG. 2b. During this pivotal movement the pin 65 has moved past a side wall 68 of the heart-shaped projection 56. A guide 69 ensures that the pin 65 engages in a recess 70 in the heart-shaped projection 56.

The lever arm 55 carries a limb 71. As can be seen in FIGS. 3 and 4, this limb 71 cooperates with a blade spring 72 and is guided in a slot 73 in the frame 1. With its free ends the blade spring 72 acts against members 76 and 77 which are pivotally journalled in the head-mounting plate 74. In its center this head-mounting plate 74 carries a sound head 75. On each side of the sound head 75 the plate 74 also carries one of the members 76, 77 in which the pressure rollers 78, 79 are journalled. The members are urged against stops 74a and 74b on the head-mounting plate 74.

The head-mounting plate 74 has angular end portions 80, 81. The end portion 80 is formed with a slot 82, in which a pin 83, mounted on the pivotal arm 16, is movable. Thus, in the position shown in FIG. 3, the pivotal arm 16 has pivoted about the spindle 15 in such a manner that the switching wheel 14 is in mesh with the play wheel 25 and the gear wheel 12. In a similar way FIG. 4 shows that the end portion 81 of the head mounting plate 74 has pivoted the pivotal arm 19 about the spindle 18, so that the gear wheel 17 is in mesh with the play wheel 24 and the gear wheel 11. Moreover, in the position shown in FIG. 3 the pressure roller 79 is urged against the capstan 10 and in the position shown in FIG. 4 the pressure roller 78 is urged against the capstan 9.

Guide Slots and Pins

In the head-mounting plate 74 slots 84, 85 are formed, which slots extend parallel to the connecting line between the capstans 9, 10. Guide pins 86, 87 are movable in these slots.

Figure 5:
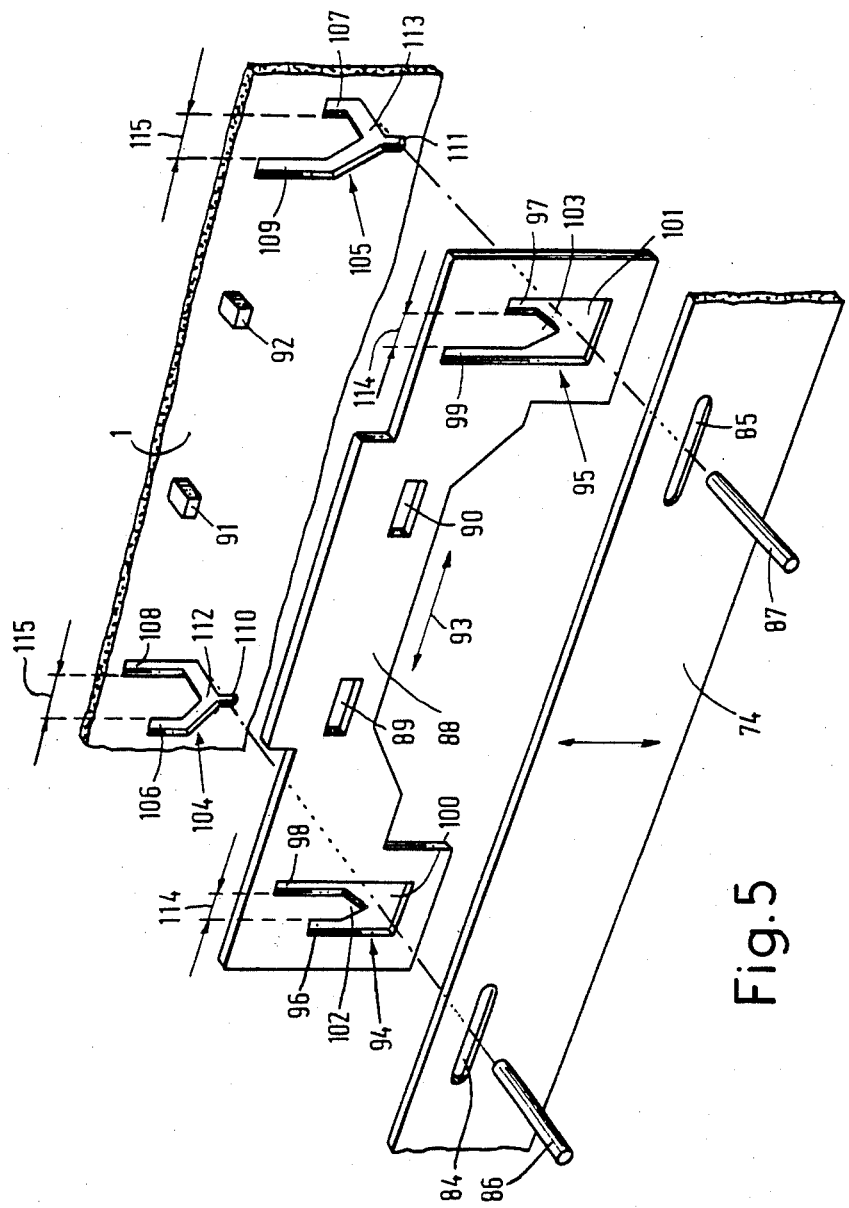
FIG. 5 is an exploded view which shows how a guide-slot system cooperates with a control means and a head-mounting plate.

The exploded view in FIG. 5 shows the guide pins 86, 87 which are guided in the slots 84, 85 in the head-mounting plate 74. Thus, the guide pins can be moved parallel to the connecting line a between the capstans. How the guides 86, 87 are retained in the head-mounting plate 74 is not shown. A simple construction is to secure the guide pins to a cap in the same way as the pin of a thumbtack. However, alternatively, the guide pins may be arranged on the free ends of resilient tongues which are secured to the head-mounting plate 74.

A control plate 88, which serves as the control means, is arranged between the head-mounting plate 74 and the upper side of the frame 1. This control plate 88 is formed with longitudinal slots 89, 90 through which projecting guides 91, 92 on the chassis plate extend. As a result of this, the control plate 88 is movable parallel to the imaginary connecting line a between the capstans 9, 10. In FIG. 5 this movement is indicated by a double arrow 93.

On each end the control plate 88 is formed with a U-shaped slot 94, 95. The U-shaped slots 94 and 95 each have a short branch 96, 97 and a long branch 98, 99. The short branches are remote from each other and the long branches are disposed closer to each other. The connecting portions 100 and 101 between the short and the long branches are substantially wider. Between the long and short branches tongues 102 and 103 are formed, which tongues have pointed ends which face the connecting portions 100, 101.

Fork-shaped guide slots 104 and 105, which constitute a guide-slot system, are formed in the frame 1. These slots 104, 105 each comprise two branches corresponding to the fork tines, one branch 106, 107 being shorter than the other branch 108, 109. Again the short branches of the slots are remote from each other and the long branches are situated closer to each other. A central run-in branch 110, 111 opens into the trough-shaped fork base 112, 113 of the guide slots 104, 105. The distance 114 between the branches of the U-shaped guide slots 94, 95 in the control plate 88 is smaller than the distance 115 between the lateral branches of the fork-shaped guide slots 104, 105.

FIGS. 3 and 4 show that the angular end portion 80 of the head-mounting plate 74 has an extension formed with a guide surface 116. Moreover, the angular end portion 80 carries two pins 117, 118 which project from the plane of the drawing and whose connecting line g extends substantially parallel to the direction of movement of the head-mounting plate 74. The guide surface 116 cooperates with a first switch 119 whose switching lever 120 is actuated by the guide surface 116. To accomplish this, the switching lever 120 partly follows the guide surface to open and close the switch 119. In the position of the head-mounting plate 74 and its angular end portion 80 shown in FIGS. 3 and 4 the switch 119 is closed. In this closed position the amplifier is connected to the magnetic head 75 and audio signals can be transferred to the loudspeakers. As soon as the head-mounting plate is withdrawn for the purpose of fast winding or switching off, the switch 119 opens and the amplifier is disconnected from the head 75. This ensures that, for example, during fast winding no disturbing signals are audible.

Near the pins 117, 118 a second switch 121 is arranged whose switching lever 122 extends between the pins 117, 118. This switch is shown to an enlarged scale in FIG. 7.

The rod 62 in FIGS. 3 and 4 has an intermediate portion 123 which co-operates with a third switch 124. This switch 124 comprises two contact springs 125, 126. One of these contact springs can follow an oblique surface 123a of the intermediate portion 123 with its free end portion 127. In this way the third switch 124 can be opened and closed. In the playing position shown in FIGS. 3 and 4 the third switch 124 is closed. The third switch 124 energizes the drive motor 3 of the deck. The rear end portion 128 of the rod 62 has a switching tip 129 which can cooperate with the switching lever 122.

The Switch

Figure 7:
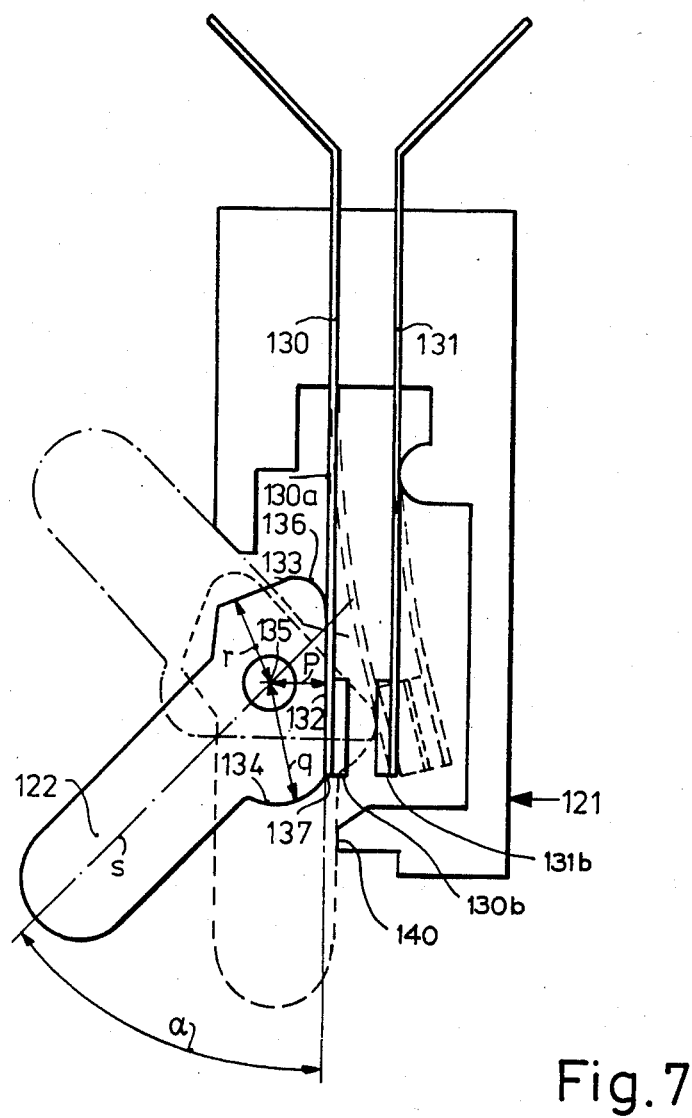
FIG. 7 is a diagrammatic view of an open switching device whose switching lever can be pivoted into two stable and one unstable switch positions, represented by different lines.

FIG. 7 shows the second switch 121 of the switching device with one side wall removed to expose the contact springs 130 and 131 in the interior of the switch. These contact springs 130 and 131 co-operate with the switching lever 122. Each contact spring has a free end, at which a respective contact element 130b, 131b is fastened, with the contact elements facing but spaced from each other in the off position shown in solid lines. The switching lever 122 has a first flat wall 132, a second flat wall 133, and a third arcuate wall 134. The first flat wall 132 is situated at a distance P from the pivotal axis 135 of the switching lever, the second wall 133 is situated at a distance r from the axis 135, and the arcuate wall 134 is situated at a distance q. The distance P is smaller than the distances r and q. The pivotal axis 135 of the switching lever 122 extends perpendicularly to the frame 1. The transition between the first wall and the second wall constitutes a first nose 136 and the transition between the first wall 132 and the third wall 134 constitutes a second nose 137. During the pivotal movement of the switching lever 122 past the first nose 136 the second wall 133 does not reach the resilient switching contact until the first nose 136 has passed the over-center point. The first nose 136 then guides the switching lever 122 into a stable switching position (represented by dash-dot lines in FIG. 7). In this stable closed position the contact elements 130b and 131b are brought into good electrical contact because both contact springs 130 and 131 are deflected away from the pivotal axis 135. During pivotal movement of the lever 122 in the counterclockwise (opposite) direction, from the center position shown in solid lines, the second nose 137 guides the switching lever 122 to an unstable switching position (shown dotted). As shown in the drawing, the third wall is so arranged that the dimension q is greater than the value sufficient to bring contact springs 130, 131 into good electrical contact before an over-center position of the second nose 137 or third wall 134 is reached. Excessive movement in the counterclockwise direction is prevented by abutting of the lever 122 with a stop 140 formed on switch 121.

In the center off position the central axis S of the switching lever 122 makes an acute angle α with the surface 130a of the non-activated contact spring 130. In this stable position the switch is open and in the two other switching positions it is closed.

Operation

The device operates as follows. When a cassette is inserted the rod 62 moves from the position shown in FIG. 2a to the position shown in FIG. 2b. This is the position of the rod 62 shown in FIGS. 3 and 4. As a result of the outward movement the third switch 124 is set from its open position to its closed position, so that the motor is energized and started. The flywheels 7 and 8 then begin to rotate in opposite directions. At the same time the gear wheels 11 and 12 are rotated so that the gear wheels 14 and 17, respectively, with which they cooperate are also rotated.

As a result of the movement of the stop/eject rod 62 the latching lever 58 is pivoted about the spindle 59, as shown in FIG. 2a, and the latching pin 65 is positioned in the area of engagement with the heart-shaped projection 56, as shown in FIG. 2b. Moreover, owing to the outward movement of the switching tip 129 the switching lever 122, which was in the dotted position shown in FIG. 7, is released, so that it has assumed its center position (solid line in FIG. 7). As the third switch 124 is closed and the second switch 121 is opened the apparatus is now set electrically from radio operation to tape operation via an electronic circuit, not shown.

As the gear wheels 14 and 17 are not in mesh with the gear wheels 24 and 25, the two winding spindles 20 and 21 are not driven. The discs 41 and 42 are coupled to the winding spindles 20, 21 through separate slipping clutches and are therefore also stationary. Since no torque is exerted on the switching member 46 when the cassette is inserted, because the reels do not rotate and there is no tape transport, the switching member 46 remains in the position shown in FIG. 1 and the pin 49 is moved against the outer side of the guide wall 51. As a result of this, the switching member 46 is moved in a clockwise direction, as indicated by the arrow 46a, and the connecting member 52 is pivoted counterclockwise, as indicated by the arrow 67. Since the latching lever 58 has pivoted and the pin 65 is positioned in the area of engagement with the heart-shaped projection 56, the pin 65 now travels along the wall 68 of the heart-shaped projection 56 and engages the recess 70. Thus, the connecting member is latched in a pivotal position (see FIG. 2b).

Owing to the pivotal movement of the connecting member 52 in the counterclockwise direction indicated by the arrow 67, the limb 71 has moved inwards and is urged against the blade spring 72. The blade spring in its turn acts against the head-mounting plate 74 through the members 76 and 77 and tends to urge this plate towards the capstans 9, 10. Now the action of the control plate 88 manifests itself.

Figure 6A:
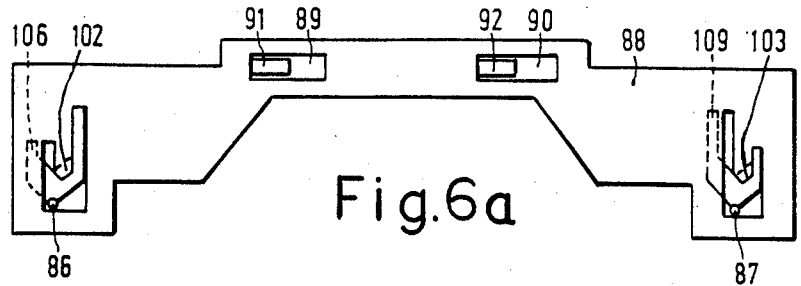
FIGS. 6a–6d are views of a control plate for controlling the guide-slot system and a head-mounting plate, in different positions.
Figure 6B:
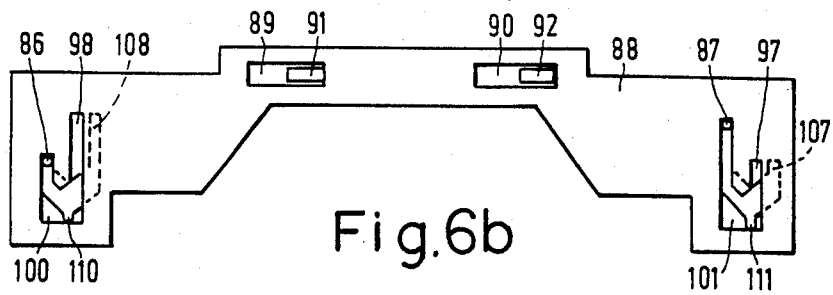

Prior to the inward pivotal movement of the limb 71 the head-mounting plate 74 is clear of the capstans. As a result of this, the guide pins 86, 87 have engaged the run-in branches 110 and 111 (see FIG. 5). The control plate 88 has assumed the position shown in FIG. 6a. When the head-mounting plate 7 is moved towards the capstans 9, 10 the guide pins 86, 87 move forwards and abut with the left-hand sides of the tongues 102, 103 to run into the left-hand branches 106 and 109 of the guide slots 104, 105. The left-hand guide pin 86 then abuts the bottom of the shorter branch, while the right-hand guide pin 87 can move freely towards the capstan 10 (see FIG. 6b). As a result of this, the advanced head-mounting plate 74 swings forwards towards the right, in such a way that the right-hand pressure roller 79 is applied to the right-hand capstan 10. The other capstan remains free. Consequently, the tape runs in the direction indicated in FIG. 3.

As stated previously, the first switch 119 has been closed during the forwad movement of the head-mounting plate 74. Thus, the head 75 is electrically connected to the amplifier and audio signals can be transferred from the tape to the loudspeakers. At the same time the switching lever 122 of the second switch 121 has been moved by the pin 117 from the position shown in solid lines in FIG. 7 to the dashed position. As a result, the switch 121 is closed and the correct tracks of the head 75 are now switched on. In a manner, not shown, the tape-transport direction may be displayed by a light indicator controlled by this switch.

If in the situation shown in FIG. 3 fast winding is required after the tape has been played with the normal speed in the forward direction, button 31 is pressed for fast forward and button 32 for fast reverse. As already stated, the head-mounting plate 74 is withdrawn but not entirely into the stop/ejection position. As a result of this, the first switch 119 opens, so that no signals can be supplied to the loudspeakers during fast winding. In this respect it is important that the distance between the pins 117 and 118 is selected so that the pin 118 does not move the switching lever 122 out of its predetermined position when the head-mounting plate is withdrawn partly. Therefore, the tracks are not switched over during fast winding. The switching direction remains the same. This is important in searching for pauses, when it is necessary that the same tracks remain switched on during playing and searching.

Figure 6C:
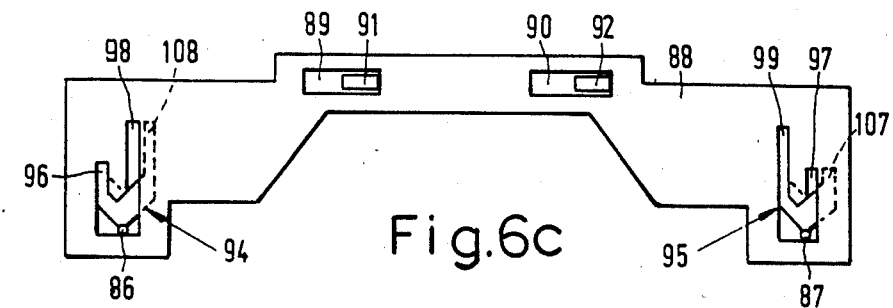
Figure 6D:
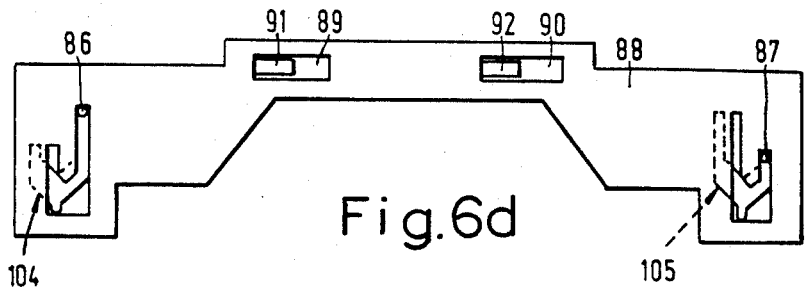

When the end of the tape is reached the tape stops. As a result, the switching member 46 with the pin 49 is again pivoted in the clockwise direction and the connecting member 52 is again pivoted counterclockwise (FIG. 2b) in the direction indicated by the arrow 67. During this movement the connecting number 52 is pivoted beyond the normal travel obtained when it is in its latched position. This overtravel is possible because the limb 71 acts against the blade spring 72 on the head-mounting plate 74 through the members 76, 77, and thus has room for a movement towards the head-mounting plate. During this overtravel the pin 76 leaves the recess 70 and the latching mechanism 57 is released. Under the influence of the spring 54 the released connecting member 52 is now pivoted clockwise, so that the limb 71 moves outwards. In this position the head-mounting plate has moved outwards and the guide pins 86, 87 again engage with the run-in branches 110 and 111. The control plate 88 remains in its last position. The tongues 102 and 103 thus remain in a position which is shifted to the left relative to the center of the run-in branches (110 and 111 (FIG. 6c).

When the head-mounting plate is shifted back the first switch is opened immediately, so that no signals are applied to the loudspeakers. At the same time the switching lever 122 is set by the pin 118 to the center position shown in FIG. 7. Thus, the switch 121 is open. As a result of this, the tracks are changed over to reverse operation. The switching lever 122 is then in the position shown in FIG. 4.

Now the reversal of the tape-transport direction begins. The switching wheel 14 continues to rotate. Since the head-mounting plate 74 has moved backwards its end portion 80 has moved outwards and has thereby moved the pivotal arm 16 in such a way that the switching wheel 14 is no longer in mesh with the play wheel 25. The detection means 40 then detects tape stoppage. Again the switching member 46 is pivoted clockwise. The switching member 46 presses against the connecting member 52 and pivots the latter again counterclockwise in the direction indicated by the arrow 67. As a result, the pin 65 again cooperates with the heart-shaped projection 56 and finally engages the recess 70, thereby latching the connecting member 52. The limb 71 has now moved forwards again and the head-mounting plate 74 occupies the position shown in FIG. 4 after the forward movement. By engagement with the end portion 81 of the head-mounting plate 74, the gear wheel 17 comes into mesh with the gear wheel 11 and with the play wheel 24. In this position shown in FIG. 4 the pressure roller 78 is applied to the capstan 9 and the tape runs in the opposite direction.

In the reverse playing direction as shown in FIG. 4, fast winding may also be required, which may be started by pressing one of the buttons 31 or 32. For fast forward winding button 32 should be pressed and for fast reverse winding button 31 should be pressed. As a result of the distance between the pins 117 and 118 the pins 117 and 118 do not contact the switching lever 122 during the backward movement of the head-mounting plate 74, so that this lever remains in its center position. Consequently, the tracks are not switched over.

The reversal of the direction of tape transport is achieved by means of the system of guide slots which is shown in various positions in FIG. 6. The last position described is the position shown in FIG. 6c. In this position the control plate 88 has been moved to the left and the guide pins 86, 87 engage the run-in branches 110 and 111. Since the head-mounting plate 74 is moved forwards towards the capstans again, the guide pins 86, 87 are also moved forwards and abut with the right-hand oblique surfaces of the pointed tongues 102 and 103. Consequently, the guide pins 86, 87 are moved to the right and move further into the branches 108 and 107. The transverse movement of the guide pins 86, 87 is possible owing to the sliding movement of the guide pins 86, 87 in the slots 84, 85. When the guide pins 86, 87 engage with the branches 107 and 108 these pins have moved the control plate 88 so far to the right that the branches 108, 98 and 107, 97 coincide. As a result, the tongues 102, 103 are positioned so that when the guide pins again move backwards and forwards they can abut with the left-hand oblique surfaces of the tongues 102 and 103. This position of the system of guide slots is shown in FIG. 6d. The guide pin 87 is retained in the shorter branches 107 and 97, which prevents the head-mounting plate 74 from moving further to the right. On the left-hand side the guide pin 86 can move freely in the branches 108 and 98, so that on the left-hand side of the head mounting plate 74 the spring 72 can urge the pressure roller 78 against the capstan 9. This position is shown in FIG. 4.

The rod 62 may also be used for the manual reversal of the direction of tape transport. For this purpose the rod 62 is moved inwards over only a part of its length. As can be seen in FIG. 2b, the latching mechanism 57 is then unlatched. The guide pin 60 in FIG. 2b then travels only through the first half of the guide slot 61. The mechanism now performs the switching cycle for the reversal of the tape-transport direction, as described above. The tape-transport direction is thus reversed. Here, it is essential that the third switch 124 is opened, so that the motor 3 stops. The apparatus is not switched to radio operation because the limited depression of the switching tip 129 does not set the switch 121 to its unstable switching position. If the button 63 is released, it returns to its initial position under spring force. The switch 124 is then closed again, the motor 3 is energized again, and when the switching cycle (described above) has been repeated the tape transport is started in the reverse direction.

However, if the button 63 and hence the rod 62 are depressed fully to obtain ejection, the switching tip 129 moves the switching lever 122 into the dotted position in FIG. 7. This is an unstable switching position, in which the switch 121 is closed. This switching position is sustained because the rod 62 remains depressed after ejection of a cassette until a new cassette is inserted. Depression of the rod 62 results in the motor switch 124 being opened, so that the motor 3 stops. As the switch 124 is opened and the switch 121 is closed, the electronic circuit of the apparatus causes this apparaturs to be set from tape operation to radio operation. Further, this depression, as shown in FIG. 2a, results in unlatching of the latching mechanism 57 and in an outward movement of the head-mounting plate 74 under the influence of the spring 54. The head-mounting plate 74 remains in this position with the motor 3 stationary.

FIG. 8 illustrates the individual switching operation of the switch 121. FIG. 8A shows the switching lever 122 in a position which is shown in solid lines in FIG. 7. This is the position in which the head-mounting plate 74 is withdrawn completely. This is, for example, the position in the case of end of tape; i.e. between the turn-off operation and a new starting operation. If the head-mounting plate is now moved forwards towards the capstans in the direction indicated by the arrow 138, the pin 117 will set the switching lever 122 to the position shown in FIG. 8B. This is the position shown in FIG. 3 during normal forward tape transport. FIG. 8C shows that the switching lever 122 is not actuated when the head-mounting plate 74 is partly withdrawn from the normal forward position for the purpose of fast winding.

Figure 8A:
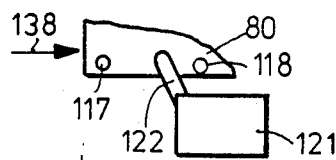
FIGS. 8A–8G show different switch positions in the apparatus.
Figure 8B:
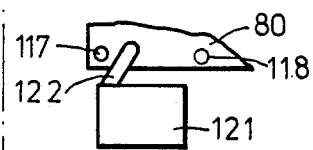
Figure 8C:
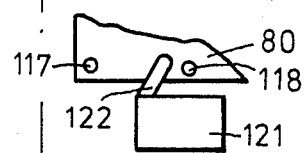
Figure 8D:
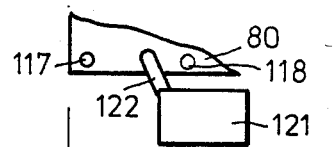
Figure 8E:
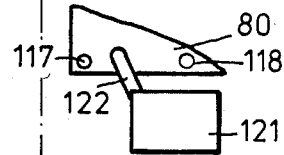
Figure 8F:
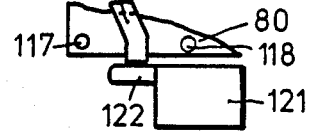

For example, when the end of tape is reached, the head-mounting plate 74 is moved back to the left, causing the switching lever 122 to be set to the center position shown in FIG. 7 by means of the pin 118 (FIG. 8D). In order to start reverse operation the head-mounting plate is again moved forwards to the position shown in FIG. 8E. If now fast winding is required during reverse operation, the head-mounting plate 74 hardly moves at the location of the pins because it pivots about a point which is situated near the pins, until it reaches a parallel position relative to the connecting line a. This fast-wind position is shown in FIG. 8F.

Figure 8G:
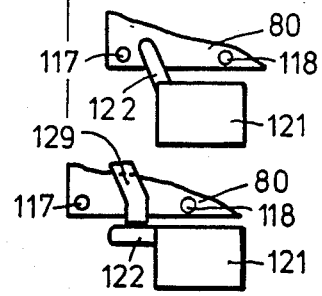

Finally, FIG. 8G shows a position in which the head-mounting plate is withdrawn completely and the rod 62 with the switching nose 129 has pressed down the switching lever 122. As described hereinbefore, this is a requirement to allow change-over from tape operation to a radio operation.

I claim:

1. A magnetic-tape-cassette apparatus, comprising
a chassis,
a head-mounting plate mounted to said chassis for movement at least between a playing position and a stop/ejection position, and
a switch carried on said chassis, said switch comprising a switching lever pivotable about a pivotal axis, and switching contacts with which said lever cooperates; said lever being arranged to be set to a selected one of three operating positions, in a center off position of said lever said contacts remaining open, and in a stable closed position and an unstable closed position said contacts being closed, said closed positions of said lever being disposed to respective opposite sides of said center position,
characterized in that said switching lever has an over-center position between said center off position and said stable closed position, and said apparatus further comprises:
a first projection carried on said plate, arranged to engage and pivot said switching lever into said stable closed position upon movement of the head-mounting plate to the playing position,
a second projection carried on said head-mounting plate, arranged to engage and pivot said switching lever to said center position upon movement of the plate to the stop/ejection position, said second projection being clear of said switching lever while said lever is in said stable closed position and said center position, and
an actuating rod having a switching tip, movably mounted to said chassis and arranged so that upon actuation of said rod said tip engages and pivots said lever from the center position to the unstable closed position, continued actuation of said rod retaining said lever in said unstable closed position.

2. An apparatus as claimed in claim 1, characterized in that said projections are aligned such that a connecting line extending between them extends substantially parallel to the direction of movement of the head-mounting plate; and said projections are spaced such that said projections do not engage said lever during movement from the playing position into a winding position in which the plate is withdrawn from engagement with a magnetic tape.

3. A device as claimed in claim 2, characterized by comprising means responsive to actuation of said rod for moving said plate so as to pivot the switching lever to said center off position prior to engagement of said rod tip with said switching lever, said rod tip passing between said projections during movement of said lever from the center position to the unstable closed position.

4. A magnetic-tape-cassette apparatus, comprising
a chassis,
a head-mounting plate mounted to said chassis for movement at least between a playing position and a stop/ejection position,
a switch carried on said chassis, said switch comprising a switching lever pivotable about a pivotal axis, and first and second switching contacts with which said lever cooperates; said lever being arranged to be set to a selected one of three operating positions, in a center off position of said lever said contacts remaining open, and in a stable closed position and an unstable closed position said contacts being closed, said closed positions of said lever being disposed to respective opposite sides of said center position,
means for applying a spring biasing force to said lever, arranged such that during movement of the lever from the center to the stable closed position the lever is first biased toward the center position, and the lever then passes a dead-center position and thereafter is biased toward the stable closed position, and
first means for establishing direct electrical connection between said contacts in response to movement of said head-mounting plate from said stop/ejection position to said playing position,
characterized in that said means for establishing includes a first nose and a second nose, said noses forming parts of said lever,
in said lever dead-center position said first nose is aligned with the spring biasing force at an over center point,
when the lever is between said center position and said unstable closed position, and while in said unstable closed position, said means for applying applies biasing force via said second nose to bias the lever toward the center off position,
said apparatus further comprises second means, operable while said head-mounting plate is in the stop/ejection position, for establishing direct electrical connection between said first and second contacts when the lever is in the unstable closed position, and
said switch further comprises means for preventing pivoting of said lever past the unstable closed position.

5. An apparatus as claimed in claim 4, characterized in that, upon pivoting from the center to the second operating position, said second nose is moved toward but not to the over-center point.

6. An apparatus as claimed in claim 4, characterized in that said lever includes first, second and third walls, and the second wall is flat and the third wall is arcuate.

7. An apparatus as claimed in claim 6, characterized in that the lever has an arm defining a central arm axis which, in said center off position, makes an acute angle with respect to said first wall, said first wall abutting one of said contacts.

8. An apparatus as claimed in claim 6, characterized in that the distance between the pivotal axis and the second wall and the distance between said axis and the third wall are larger than the distance between said axis and the first wall.

9. An apparatus as claimed in claim 8, characterized in that the lever has an arm defining a central arm axis which, in said center off position, makes an acute angle with respect to said first wall, said first wall abutting one of said contacts.

10. An electrical switch comprising:
a housing,
at least first and second switching contacts mounted to the housing,
a switching lever mounted to the housing for pivoting about a pivotal axis between a center off position, a stable closed position and an unstable closed position, said closed positions being on respective opposite sides of said center position,
means for establishing electrical connection between said first and second contacts in response solely to the position of the switching lever, arranged such that in the center position said contacts are disconnected from each other, and in said stable closed position electrical connection is established between said contacts, and
means for applying a spring biasing force to said lever in a direction dependent on the lever position, arranged such that during movement of the lever from the center to the stable closed position the lever is first biased toward the center position, and the lever then passes a dead-center position and thereafter is biased toward the stable closed position,
characterized in that said means for establishing includes a first nose and a second nose, said noses forming parts of said lever,
in said lever dead-center position said direction of the spring biasing force is aligned with said first nose and said pivotal axis,
when the lever is between said center position and said unstable closed position, and while said lever is in said unstable closed position, said means for applying applies biasing force via said second nose to bias the lever toward the center off position,
said means for establishing establishes direct electrical connection between said first and second contacts when the lever is in said unstable closed position, and
said switch further comprises means for preventing pivoting of said lever past said unstable closed position.

11. A switch as claimed in claim 10, characterized in that:
said lever includes first, second and third walls, said first nose being formed by a transition between the first and second walls, and said second nose being formed by said third wall,
in said center off position one of said contacts abuts the first wall,
in the stable closed position said one of said contacts abuts said second wall, and
in said unstable closed position said one of said contacts abuts said third wall.

12. A switch as claimed in claim 11, characterized in that, upon pivoting from the center off to the unstable closed position, said second nose is moved toward but not to a second dead-center position.

13. A switch as claimed in claim 12, characterized in that said second wall is flat and said third wall is arcuate.

14. A switch as claimed in claim 13, characterized in that said lever has an arm defining a central arm axis, in said center off position said central arm axis being at an acute angle with respect to said first wall.

15. A switch as claimed in claim 14, characterized in that said one contact comprises a first contact spring having a free end, and a contact element disposed on said spring at said free end, in said center off position said contact spring abutting said first wall,
the other of said contacts comprises a second contact spring having a free end, and a second contact element disposed on said second spring free end, in said center off position said contact elements facing each other between said spring free ends, and being spaced apart, and
in said closed positions said switching lever deflecting said first contact spring away from said pivotal axis such that said contact elements abut each other and said second contact spring is deflected away from said pivotal axis.

* * * * *

UNITED STATES PATENT AND TRADEMARK OFFICE
CERTIFICATE OF CORRECTION

PATENT NO. : 4,656,321

DATED : April 7, 1987

INVENTOR(S) : HENRICUS M. RUYTEN

It is certified that error appears in the above-identified patent and that said Letters Patent is hereby corrected as shown below:

IN THE CLAIMS

Claim 5, lines 2-3, change "second operating" to --unstable closed--

Claim 11 line 6, after "formed by" insert --a transition between said first wall and--

Signed and Sealed this

Nineteenth Day of April, 1988

Attest:

DONALD J. QUIGG

Attesting Officer   Commissioner of Patents and Trademarks